UNITED STATES PATENT OFFICE.

PAUL JULIUS, OF LUDWIGSHAFEN, AND FRIEDRICH MORITZ JAHRMARKT, OF MANNHEIM, GERMANY, ASSIGNORS TO BADISCHE ANILIN AND SODA FABRIK, OF LUDWIGSHAFEN, BAVARIA, GERMANY, A CORPORATION OF GERMANY.

CHLORANISIDIN.

SPECIFICATION forming part of Letters Patent No. 695,812, dated March 18, 1902.

Application filed December 23, 1901. Serial No. 87,003. (No specimens.)

*To all whom it may concern:*

Be it known that we, PAUL JULIUS, doctor of philosophy and chemist, a subject of the Emperor of Austria-Hungary, residing at Ludwigshafen-on-the-Rhine, in the Kingdom of Bavaria, and FRIEDRICH MORITZ JAHRMARKT, doctor of philosophy and chemist, a subject of the King of Saxony, residing at Mannheim, in the Grand Duchy of Baden, Germany, have invented new and useful Improvements in Chloranisidin, of which the following is a specification.

This invention relates to a new chlor-anisidin and process of producing the same. This new product when diazotized may be employed for the production of scarlet shades on cotton fiber suitably prepared with beta-naphthol, which shades are very fast to rubbing, washing, light, dilute acids, and dilute alkalies. This diazo compound when suitably combined with beta-naphthol in the presence of a substratum can also yield very fast pigments. The combination of this diazo compound with beta-naphthol just mentioned may be effected in accordance with the methods usual in the arts for similar operations.

In the following we describe a process by means of which our new chlor-anisidin may be obtained. The invention is not limited to the proportions and conditions therein given. The parts are by weight, and the temperature degrees refer to the centigrade scale.

Example: Dissolve one hundred and ninety-two (192) parts of nitro-para-dichlor-benzene in two hundred and fifty (250) parts of wood-spirits. Gradually add to this a solution of sixty (60) parts of solid caustic potash in two hundred (200) parts of wood-spirits and boil under a return-condenser for about two (2) hours. Then distil off the greater part of the wood-spirits remaining. Extract the solid matter which separates out with preferably boiling ethyl alcohol. Cool the extracts and collect the crystalline product which separates out. This product, which we regard as chlor-nitro-anisol, can be purified by recrystallization from ethyl alcohol or ether and then occurs in the form of pale-yellow crystals, which melt at ninety-six and five-tenths (96.5) degrees. The nitro-chlor-anisol so obtained may be converted into the corresponding amido compound (chlor-anisidin) by introducing it in the usual manner into a mixture of water, iron-filings, and acetic acid, which is heated by means of boiling water. This conversion requires approximately three (3) hours. When conversion is completed, add carbonate of soda to the mixture until it is distinctly and permanently alkaline to litmus-paper and distil off the product with steam.

Our new chlor-anisidin, which may be obtained as just set forth, when crystallized from ethyl alcohol occurs in the form of colorless scales, which melt at about eighty-three (83) degrees, are difficultly soluble in cold water and more easily soluble in ethyl alcohol and in ether. Its acetyl derivative melts at about one hundred and three (103) degrees.

Our new chlor-anisidin forms salts with hydrochloric, nitric, and with sulfuric acid, which in the purified state are white crystalline substances. This sulfuric-acid salt melts at about one hundred and seventy (170) degrees, whereas the nitrate and the hydrochlorate decompose when heated to about one hundred and seventy (170) and two hundred and twenty (220) degrees, respectively. The diazo compound of this new chlor-anisidin when suitably combined with beta-naphthol yields a scarlet substance which is practically insoluble in water and which gives with concentrated sulfuric acid a violet-red color.

What is claimed is—

As a new article of manufacture chlor-anisidin having a composition corresponding to the formula $C_7H_8ONCl$, which occurs as a white substance melting at about eighty-three (83) degrees, and which chlor-anisidin in the form of its salt with sulfuric acid is a white substance melting at about one hundred and seventy (170) degrees, and which chlor-anisidin in the form of its acetyl derivative is a white substance melting at about one hundred and three (103) degrees, and which chlor-anisidin in the form of its salts with nitric acid and with hydrochloric acid forms white substances which when heated decompose, and which chlor-anisidin when diazotized and then combined with beta-naphthol yields a red substance practically insoluble in water, which red substance gives a violet-red color with concentrated sulfuric acid.

In testimony whereof we have hereunto set our hands in the presence of two subscribing witnesses.

PAUL JULIUS.
FRIEDRICH MORITZ JAHRMARKT.

Witnesses:
BERNHARD C. HESSE,
JACOB ADRIAN.